United States Patent
Aranda et al.

(10) Patent No.: US 9,963,352 B2
(45) Date of Patent: May 8, 2018

(54) ALUMINA AND CARBONATE PRODUCTION METHOD FROM Al-RICH MATERIALS WITH INTEGRATED CO2 UTILIZATION

(71) Applicants: Nordic Mining ASA, Oslo (NO); Institutt for Energiteknikk, Kjeller (NO)

(72) Inventors: Asunción Aranda, Oslo (NO); Johann Mastin, Stavanger (NO)

(73) Assignee: NORDIC MINING ASA, Oslo (NO)

( * ) Notice: Subject to any disclaimer, the term of this patent is extended or adjusted under 35 U.S.C. 154(b) by 0 days. days.

(21) Appl. No.: 15/124,487

(22) PCT Filed: Mar. 11, 2015

(86) PCT No.: PCT/NO2015/050049
§ 371 (c)(1),
(2) Date: Sep. 8, 2016

(87) PCT Pub. No.: WO2015/137823
PCT Pub. Date: Sep. 17, 2015

(65) Prior Publication Data
US 2017/0015564 A1   Jan. 19, 2017

(30) Foreign Application Priority Data

Mar. 12, 2014  (NO) .................. 20140317

(51) Int. Cl.
*C01F 7/00*  (2006.01)
*C01F 7/22*  (2006.01)
(Continued)

(52) U.S. Cl.
CPC ............... *C01F 7/22* (2013.01); *C01B 32/60* (2017.08); *C01D 7/16* (2013.01); *C01D 7/26* (2013.01);
(Continued)

(58) Field of Classification Search
CPC ... C01D 7/26; C01D 7/16; C01F 11/18; C01F 5/24; C01F 7/306; C01F 7/56; C01F 7/22;
(Continued)

(56) References Cited

U.S. PATENT DOCUMENTS

| 4,224,287 A | 9/1980 | Ziegenbalg et al. |
| 8,268,269 B2 * | 9/2012 | Haase .................. C01B 11/062 210/716 |
| 2010/0093995 A1 | 4/2010 | Baniel et al. |

FOREIGN PATENT DOCUMENTS

| GB | 857245 | 12/1960 |
| GB | 2042486 | 9/1980 |

(Continued)

OTHER PUBLICATIONS

International Search Report and Written Opinion for PCT/NO2015/050049, dated Jul. 6, 2015.

*Primary Examiner* — Steven J Bos
(74) *Attorney, Agent, or Firm* — Alix, Yale & Ristas, LLP

(57) ABSTRACT

A process for alumina and carbonate production from aluminium rich materials with integrated $CO_2$ utilization, comprising: comminuting and leaching Al-rich materials in concentrated HCl; separating unreacted material from metal chloride solution; separating $Al^{3+}$ from solution by crystallization of $AlCl_3 \cdot 6H_2O$; calcination of $AlCl_3 \cdot 6H_2O$ with HCl recovery; precipitation of metal carbonates from $CO_2$; regeneration of HCl and extractive amines; the $Al^{3+}$ separation the facilitated by increasing HCl concentration; the calcination being performed in two steps, one in the range 400 and 600° C. to generate a HCl-rich gas and one above 600° C. to produce $Al_2O_3$; for precipitating metal carbonates, mixing the metal chloride solution with an organic solution containing a selected amine and contacting the (Continued)

mixture with a $CO_2$-containing gas, thereby also extracting HCl by formation of an ammonium chloride salt complex; processing thermally or chemically the organic solution to regenerate the amine for recirculation.

17 Claims, 4 Drawing Sheets

(51) Int. Cl.

| | | |
|---|---|---|
| C01D 7/16 | (2006.01) | |
| C01D 7/26 | (2006.01) | |
| C01G 49/00 | (2006.01) | |
| C01G 49/06 | (2006.01) | |
| C01F 5/24 | (2006.01) | |
| C01F 7/30 | (2006.01) | |
| C01F 7/56 | (2006.01) | |
| C01F 11/18 | (2006.01) | |
| C01B 32/60 | (2017.01) | |

(52) U.S. Cl.
CPC ............... *C01F 5/24* (2013.01); *C01F 7/306* (2013.01); *C01F 7/56* (2013.01); *C01F 11/18* (2013.01); *C01G 49/0009* (2013.01); *C01G 49/06* (2013.01); *Y02P 20/142* (2015.11); *Y02P 20/152* (2015.11)

(58) Field of Classification Search
CPC ... C01G 49/0009; C01G 49/06; Y02P 20/142; Y02P 20/152; C01B 32/60
USPC ........ 423/625, 187, 189, 165, 126, 132, 626
See application file for complete search history.

(56) References Cited

FOREIGN PATENT DOCUMENTS

| GB | 2205558 | 12/1988 |
|---|---|---|
| NO | 302863 | 5/1998 |
| WO | 2010041950 | 4/2010 |
| WO | 2013037054 | 3/2013 |

* cited by examiner

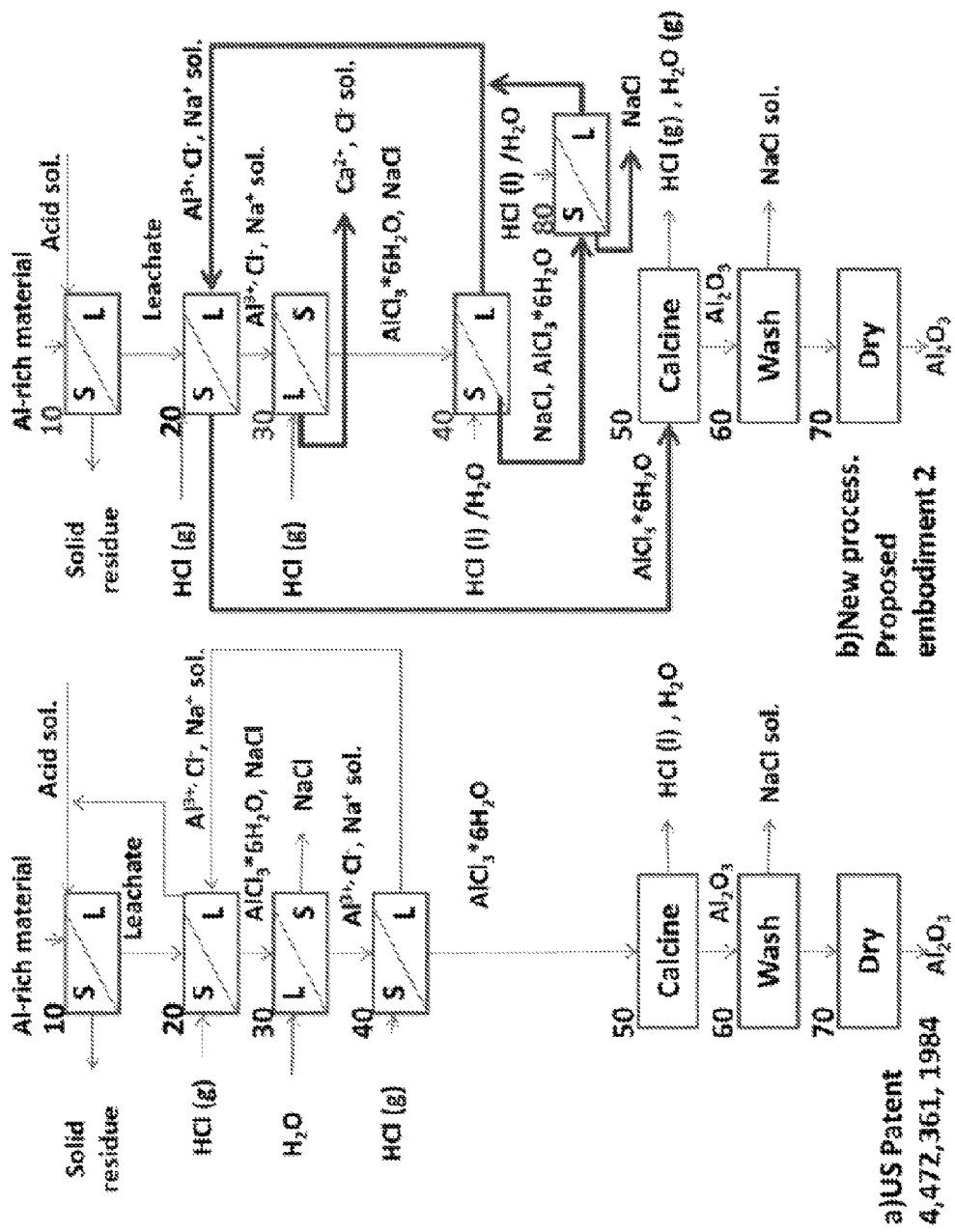

ALUMINA AND CARBONATE PRODUCTION METHOD FROM Al-RICH MATERIALS WITH INTEGRATED CO2 UTILIZATION

BACKGROUND OF THE DISCLOSURE

Alumina ($Al_2O_3$) for production of aluminum is largely produced from bauxite (more than 95 wt %). However, in recent years, the availability of good grade bauxite has diminished and the price has correspondingly increased. The bauxite processing generates environmental problems (e.g. red mud) particularly when processing lower grade bauxite. For these reasons, considerable interest has been put on production of alumina from aluminum rich silicate rocks, such as anorthosites, nepheline syenites and feldspar/feldspathoid minerals derived from such rocks, as it is known that these rocks and minerals can be dissolved directly in strong mineral acids, without any costly pretreatment step, such as high temperature roasting.

Particularly anorthosites, with high anorthite content have received much attention, an example being Norwegian patent No. 323417 (Eriksen et al.). Lately sedimentary rocks, such as argillite (clay/mudstone) have also received considerable interest. 'Anorthosite' is a collective term for igneous rocks characterized by a predominance of plagioclase feldspar (90-100%), and a minimal mafic component (0-10%). The plagioclase feldspar series contains a variety of Na—Ca—Al silicates between the two end members albite ($NaAlSi_3O_8$) and anorthite ($CaAl_2Si_2Og$). Norway has abundant occurrences of anorthosite, some with high anorthite content (70 to 80%) located at the western coast. Due to the high alumina content ($Al_2O_3$>30%) in the Gudvangen deposit (estimated at >500 M Tonnes of anorthosite) located in Sogn og Fjordane, recovery of alumina from Norwegian anorthosite has been subject to extensive studies.

One of the largest research efforts was invested into the Anortal project (1976-1987), a process to produce alumina from anorthosite, based on leaching or dissolving the mineral with a mineral acid and the subsequent precipitation of aluminium trichloride hexahydrate ($AlCl_3 6H_2O$) from the acid phase. A technological path for a nitric acid route was patented (U.S. Pat. No. 4,110,399 A) by the Institutt for Atomenergi (now IFE). The technological concept was later developed and patented by Eriksen et al. as Norwegian patent No. 323417. The process according to this patent relies on leaching with nitric acid followed by subsequent solvent extraction of unwanted species (Fe, Ca) and partial acid recovery. Worldwide, other attempts have been made to obtain alumina by alternative process different from Bayern:

U.S. Pat. No. 4,110,399 (Gaudernack et al., 1978) shows a process for extraction of alumina from Al containing silicates involving leaching with sulphuric acid, extraction of iron into an organic phase while leaving Al ions in the aqueous phase, precipitation of Al as aluminium chloride hexahydrate and subsequent calcining.

U.S. Pat. No. 4,367,215 claims the production of silica with controlled properties by acid leaching of silicates, but limits the scope to the silica product and with no technological solutions for alumina or carbonates production, acid recovery, iron separation, etc.

CA patent No. 2,711,013 Al proposes an invention for the obtaining of Al from aluminous ores, by initial dissolution of the ore with acid, but focusing on the later separation of aluminium and iron ions to produce iron-rich concentrate and the later extraction of aluminium by organic extraction. Therefore, neither a sparging step for the initial aluminium separation, nor the $CO_2$ use for carbonates precipitation and nor the acid recovery by amines thermal treatment are considered in that process.

U.S. Patent application No. 2009/022640A1 proposes a process where sulfuric acid is used for leaching the aluminium-containing solid and the later use of hydrochloric acid during the sparging step is done at a temperature under 20° C. U.S. patent application No. 2012/0237418 A1 (Boudreault, Alex and Biasotto) describes a process to obtain aluminium by leaching with hydrochloric acid (the pressure is not specified) and the later separation of iron from aluminium by several pH-controlled stages by using organic extractants, therefore focused in high iron content aluminium ores (e.g. argi!!ite, nepheline). The aluminium and iron separation follow different methods and the use of $CO_2$ and carbonate production nor the acid regeneration are mentioned.

U.S. Pat. No. 4,158,042 proposes the dissolution of the Al-rich mineral with a leaching liqueur containing chloride, calcium and fluoride ions, this last used as reaction catalyst (in the form of $H_2SiF_6$ and in a quantity of 1-20 gms/liter). When applied to a Ca-rich rock (anorthosite), they propose the precipitation and separation of part of the $CaCl_2$ and the combination of this $CaCl_2$ with silica at high temperature (1100° C.) to recover part of the HCl. This sub-process for acid recovery is very energy demanding, with a highly negative impact on the possible profitability of the process.

For the separation of Al from the leaching liqueur, John E. Deutchman and Francoise Tahiani (U.S. Pat. No. 4,472,361, 1984) reported a method to separate Al and Na from a starting solid mixture of $AlCl_3$ and NaCl (coming from a quantitative precipitation by a first sparging) applying a selective redissolution of the $AlCl_3$ in water, to produce an aqueous $AlCl_3$ solution with a reduced Na concentration, and a solid NaCl product that can be separated by filtration. A second sparging with HCl gas is used to re-precipitate $AlCl_3$ from the aqueous solution. After separation of the $AlCl_3$ (i.e. ACH), the concentrated HCl solution is recirculated to the process in the first sparging step, while the solid ACH is sent to the calcination process step.

For the separation of iron, in U.S. Pat. No. 5,585,080, a method for recovering metal chlorides from silicon and ferrosilicon is described. In that work, TBP was applied for iron chloride extraction, directly after the leaching of the material, from the acid solution containing high $AlCl_3$ and $CaCl_2$ concentrations, followed by sparging of HCl gas to recover aluminium chloride. After removal of $FeCl_3$, the leachate consists of a concentrated HCl solution with metal chlorides such as $CaCl_3$, $MgCl_2$, NaCl.

Regarding the recovery of the process acid, several patents present the possibility of using organic extraction (with different amines) to extract free HCl from diluted solutions and for the later recovery of concentrated HCl by stripping of the amine (Baniel and Jansen, U.S. patent application No. 2012/0134912; Baniel and Eyal, U.S. patent application No. 2010/0093995, U.S. patent application No. 2011/0028710 and EP 2 321 218 Al; Baniel, Eyal and Jansen, WO 2010/064229 A2; Coenen, Kosswig, Hentschel and Ziebarth, U.S. Pat. No. 4,230,681; Willi Ziegenbein, Ferdinand von Praun, U.S. Pat. No. 4,272,502 A; DeVries, U.S. Pat. No. 4,640, 831). These publications are applicable for the recovery of free HCl in solution, but not for recovering Cl" ions from metal chlorides with precipitation of the corresponding metal carbonate. Other authors have proposed the $CO_2$ utilization for the precipitation of sodium bicarbonate (Hentschel, Coenen, Kosswig, von Praun and Ziebarth U.S. Pat. No. 4,337,234; Coenen, Laach, Kosswig, von Praun and Hans Regner U.S. Pat. No. 4,321, 247 A; Hentschel, Jurgen, Coenen, Kosswig, Ferdinand von Praun U.S. Pat. No. 4,320, 106A), and for the production of ammonia from ammonium chloride (Coenen, Laach, Kosswig Dieter U.S. Pat. No. 4,305,917), but not tackling the later acid recovery from the amine.

The most recent patent application related to alumina production—WO 2013/037054 A1 is based on the well-known generation of dissolved metal chlorides by the leaching of an aluminium-rich material with HCl, and the later re-precipitation of the metal chlorides by sparging with HCl. Then, the acid recovery is achieved only by the calcination of the diverse metal chlorides obtained along the process ($AlCl_3$-$6H_2O$, $FeCl_3$-$xH_2O$, $MgCl_2$-$xH_2O$, etc.) to evolve the HCl as a gas and produce metal oxides. However, low total HCl recovery can be expected if this process is applied to any Al-containing materials that have a high Ca-content since the hydro-pyrolysis of $CaCl2$ is difficult due to its low melting point and the high decomposition temperature of $CaCl_2$-$2H_2O$. Additionally, no technological solution is given for the efficient separation of sodium if the ore contains this element, which would precipitate as NaCl together with the aluminium chloride during the sparging step. This means that applying this method to e.g. anorthosite, would be doubtfully economic, due to its considerable calcium and sodium content. So technically, several Al-rich could be treated following WO 2013/037054 Al steps, but obviously only some minerals—especially those rich in iron and magnesium—are the most appropriate raw materials that could bring a competitive process. As in the previous alumina production patented alternatives, the use of $CO_2$ and the recovery of extra HCl while producing carbonates from the remaining chlorides in solution is not mentioned.

Therefore, although some of the alternative process concepts succeeded with respect to product recovery, either the economic viability of those technologies proved unfavorable in comparison to the already well-established bauxite Bayer process and/or focused on only parts of the process or did not tackle acid recovery as to make it applicable for varied aluminium sources.

SUMMARY

Disclosed herein is an improved method for obtaining alumina from aluminium-rich materials in a sustainable, cost effective and environmentally friendly manner. Also disclosed is a method for combining the production of raw material for aluminium in a manner wherein the greenhouse gas $CO_2$ is immobilized by the production of a metal carbonate that can be safely deposited or commercialized.

Finally also disclosed herein is a method for producing amorphous $SiO_2$ which can either be safely deposited or, at least partially, commercialized.

The methods disclosed herein do not strain the environment by generating toxic solid or liquid waste materials The disclosed method is for producing alumina from aluminum rich materials, which is comparable in cost efficiency and environmental impact to bauxite. The disclosed method has an added focus on the possibility of achieving environmentally benign $CO_2$ storage by precipitation of carbonates from aqueous metal-containing process streams, originating from the Al-rich material leaching or partial dissolution. The disclosed method differs from the previous attempt developed by Institutt for Atomenergi (U.S. Pat. No. 4,110,399 A) in the following aspects:

The proposed acid for the leaching (and subsequent process steps) is hydrochloric acid, instead of sulfuric acid.
A different technological solution is proposed to minimize the impurities of $Al_2O_3$ and the energy consume in the sparging step, by including the step-wise sparging process with possible re-dissolutions and re-precipitations of $AlCl_3$.
When applied to metal-rich materials that can form carbonates, $CO_2$ can be utilized, as a $CO_2$ safe storage or as a commercial byproduct, instead of the gypsum production ($CaSO_4$) claimed in U.S. Pat. No. 4,110,399 A from anorthosite. Therefore, $CO_2$ in introduced in the disclosed process as a key factor, both for environmental and economic reasons.
The combined carbonate production and acid extraction presented here introduces a new technology in the process, to enhance the total acid recovery and so improve the economics. For a better understanding of the disclosure, there have been included schematic process layouts that simplify the process into core process steps, and show the invention with some preferred embodiments as an example.

BRIEF DESCRIPTION OF THE DRAWINGS

FIG. 4 shows another preferred embodiment for the sparging step for the separation of aluminium from the leachates (4b), in comparison to Deutchman and col. Technology (U.S. Pat. No. 4,472,361, 1984) (4a).

DETAILED DESCRIPTION

Figure 1:
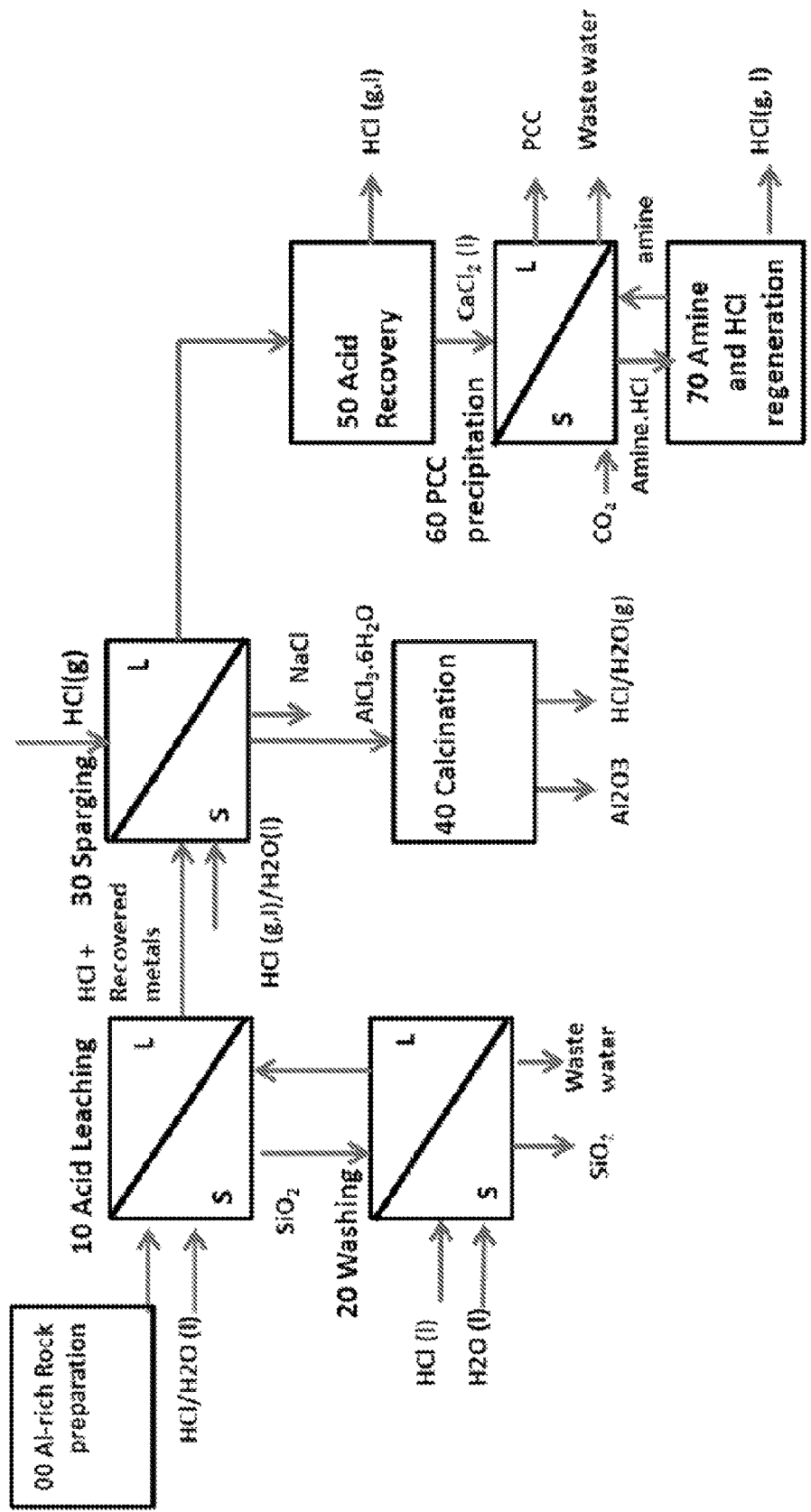
FIG. 1 shows a simplified process scheme according to one preferred embodiment of the disclosure.
Figure 2:
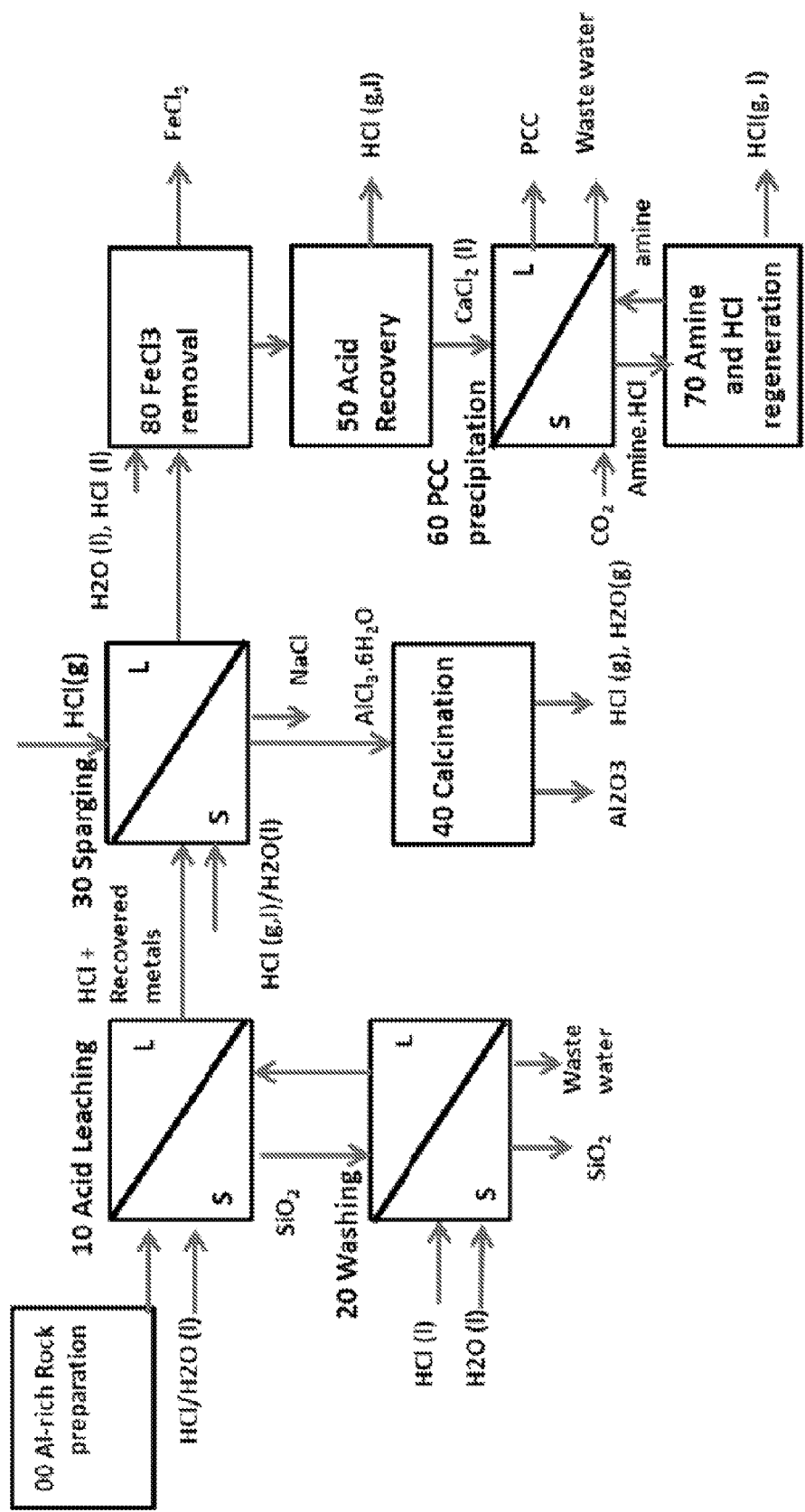
FIG. 2 shows a simplified process scheme of the disclosure, where the iron removal step (80) is included, to avoid high iron content in the produced precipitated calcium carbonate.

In the process depicted in simplified FIGS. 1 and 2, the Al-rich material is crushed and milled to a size less than 20 mm and preferably to a size under 1 mm, more preferred equal or under 0.5 mm. Fe and Mg rich fractions may be removed after the crushing, at least in part, by magnetic separation, or preferably removed by optical sorting. It is thus possible to obtain a material powder with reduced content of iron and magnesium. The prepared material is then dissolved directly in a HCl solution, at a concentration in the range 1 to 13 M, at a temperature in the range 80° C. to 180° C., and a pressure of up to 10 bars for 1 to 24 h according to the reaction (1). More preferred the temperature is under 160° C., the concentration is less than 11 M, the pressure is less than 5 bar and the leaching time is in the range 1 to 10 hours or even more preferred in the range 1 to 5 hours.

A simplified leaching reaction for an ideal Al-rich material may be represented as an example by the anorthite theoretical composition, according to the following equation:

$$CaAl_2Si_2O_8(s)+8H^+(aq) \rightarrow Ca^{2+}(aq)+2Al^{3+}(aq)+H_8Si_2O_8(aq) \qquad (1)$$

The operating conditions defined above were chosen to optimize the dissolution of $Al^{3+}$ and other cations from a silicate (e.g. $Ca^{2+}$, $Mg^{2+}$, $Na^+$) while producing an amorphous $SiO_2$ residue with the required properties for commercialization or deposition.

Since the silicate rocks are completely leached in HCl, the disclosed process also allows for production of amorphous precipitated silica, as the solid fraction remaining from the leaching.

The use of HCl ensures the formation of solubilized metal chlorides in the mother liquor which can be further separated by sparging of HCl gas, contrary to other known processes above mentioned that use different leaching solutions.

After dissolution, solid residues, for example unreacted particles and $SiO_2$, are separated from the leachate by centrifugation and/or filtration. Unreacted fractions may be separated by density or other differentiating properties, e.g, by using hydro-cyclones. After separation, unreacted fractions can be reintroduced to the acid leaching step.

After separation of the undissolved fraction, the acid leachate containing mainly $Al^{3+}$ and $Ca^{2+}$ is sent to a second process step: The aluminium chloride precipitation by sparging (bubbling) of a gas flow containing HCl, thereafter typically filtered and washed with a solution chosen among water and an acidic solution.

Aluminium can be precipitated from the leach liquor by sparging of an hydrogen chloride containing gas in the solution, utilizing the common ion effect, i.e. promoting the precipitation of hydrated aluminium chloride, $AlCl_3\text{-}6H_2O$ (ACH) by increasing the chloride ion concentration in the solution. Hydrogen chloride gas dissolves readily in the mother liquor, over a wide range of temperatures at atmospheric pressure. Due to its lower solubility limit, aluminium chloride (and, at some extent, sodium chloride if present) will precipitate as hydrated salt while $Fe^{2\ 3+}$, $Ca^{2+}$ and $Mg^{2+}$ or other more soluble metal chlorides remain mainly in solution. $AlCl_3\text{-}6H_2O$ may also be crystallized from the Al-rich metal chloride solution by mixing with a concentrated HCl solution, filtered and washed with a solution such as water or an acidic solution. Precipitated $AlCl_3\text{-}6H_2O$ and impurities may be partially redissolved with a solution chosen among hydrochloric aqueous solution and water and then filtered and recycled to the crystallization step. The Al-lean metal chloride solution may, after the crystallization step, be treated by liquid/liquid organic extraction to reduce the iron content. Furthermore, it may be treated by distillation, evaporation or other concentrating process, such as use of boilers thickeners etc., for recovery of the free acid and increase the of the metal chlorides concentration in the solution.

Other technologies had been proposed to reduce the amount of NaCl impurities in the final product when the leachate from the material contains sodium, including the later washing and re-calcination of the precipitated alumina (U.S. Pat. No. 4,472,361, 1984). These processes have the problem of having a high energy cost due to consecutive cooling and heating steps of large quantities of solids. The process has been developed under two preferred embodiments for the sparging and impurities elimination, based on the common ion effect that was experimentally observed by Deutchman and Tahiani. The new alternatives are compared to Deutchman and Tahiani's process in FIGS. 3 and 4, where 3a) and 4a) are Deutchman's technology and 3b) and 4b) are the two preferred embodiments for the disclosed process.

Figures 3A, 3B:
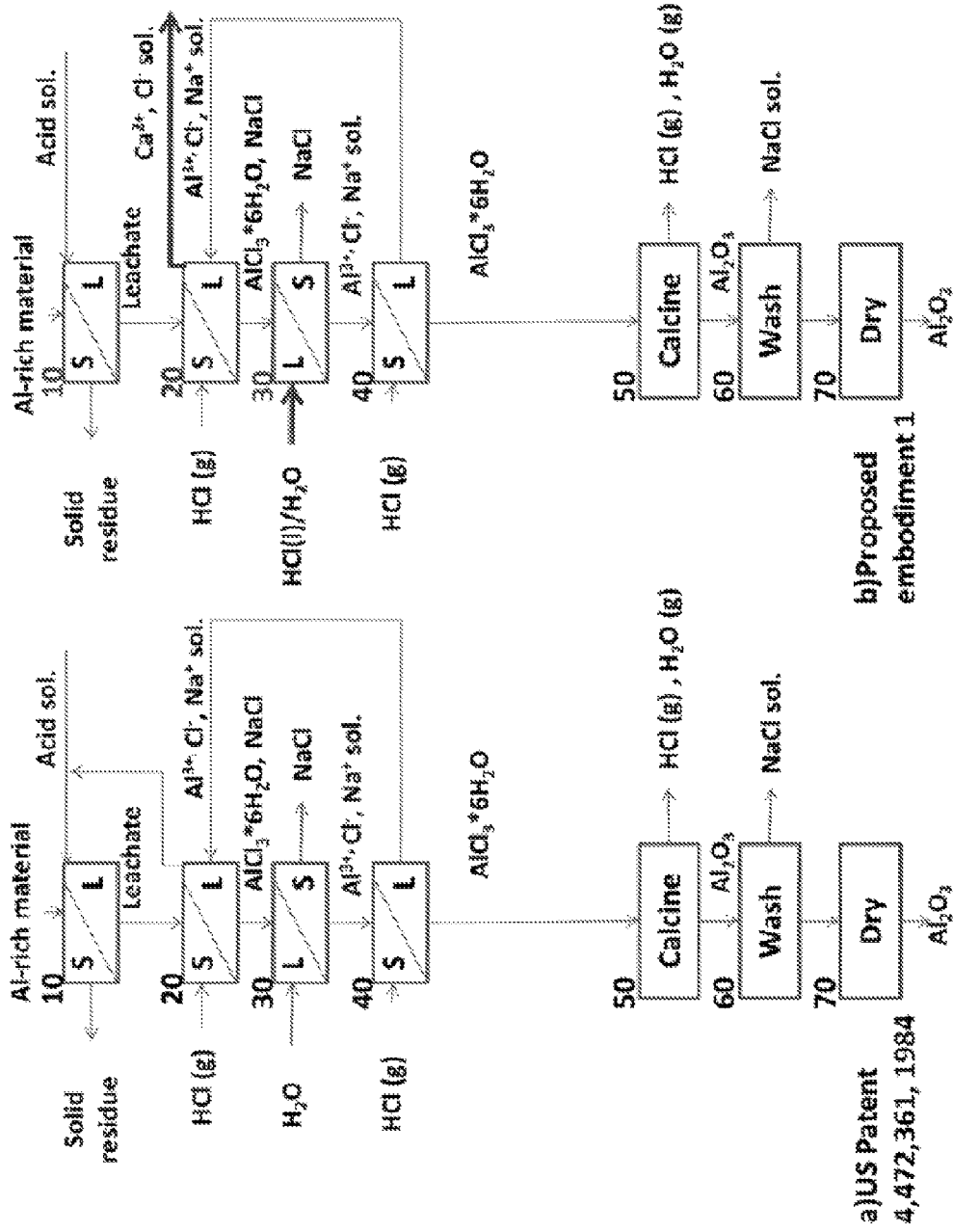
FIG. 3 shows a sub-process for the separation of aluminium from the leachates by sparging step (3b), in comparison to Deutchman and col. technology (U.S. Pat. No. 4,472,361, 1984) (3a).

In FIG. 3b, where a box is divided by a diagonal line into halves marked as S and L, this means that the step involves separation of the mixture into a liquid and a solid fraction. The first preferred embodiment modifies steps 10, 20 and 30 from Deutchman (FIG. 3a)), by purging the calcium chloride rich liquid out of the sparging system (step 20), instead of recycling it to step 10. This purge solves the problem of impurities accumulation in the system that would affect Deutchman's configuration. Indeed, the increasing concentrations of $Ca^{2+}$, $Mg^{2+}$, $Fe^{2+}/Fe^{3+}$ in the recycling loop would on the long term affect the ACH purity. Another advantage of the proposed embodiment 1 is the possibility to recover HCl from the Ca, Mg or other chloride-rich stream by production of the corresponding carbonates utilizing $CO_2$, in addition to the HCl recovery from the AlCl3 calcination (step 70). Another modification proposed in the modified sparging process is the use of acidic solution to partially redissolve the $NaCl/AlCl_3$ solid, instead of using only pure water (step 30). This alternative is preferred based on the bigger solubility differences of $AlCl_3$ and NaCl in HCl, compared to water. Deutchman and Tahiani propose a total precipitation of ACH and NaCl by a first sparging of the leachates obtained from the solid mixture of ACH and NaCl, which they partially redissolve to eliminate most of the solid NaCl (FIGS. 3a) and 4a)). Another alternative preferred embodiment is presented where it is proposed to perform a fractional or multi-stage precipitation process (FIG. 4b).

Thus, in the second proposed embodiment it is proposed a partial precipitation of ACH in the first sparging step (20). In this first partial sparging step, almost pure ACH is obtained until a certain limit of precipitate production, at a temperature between 40 and 90° C., preferably between 60 and 80° C. This first sparging step is stopped before NaCl starts precipitating quantitatively. This means that a quantitative fraction of almost pure ACH will precipitate in step 20, leaving most of the NaCl in the solution. The remaining liquid is sent to a second sparging step where the remaining ACH fraction and most of the NaCl can be precipitated and further treated (40)—by Deutchman and Tahiani method or similar—to eliminate the NaCl impurities of this second precipitate. The redissolved ACH can be sent to the first sparging step (20). Several consecutive NaCl redissolution and sparging steps may be needed to reach a suitable alumina grade depending on the application of the Al2O3. The solid NaCl separated can be used as feed for a chlor-alkali electrolysis cell for recovering HCl and producing NaOH, or can be sold as a byproduct. The product from step 20 will be send directly to the calcination (50) and, if needed, to the wash and drying steps (60, 70).

After physical separation and washing, the solid ACH is heated step-wise, first at a temperature between 400 and 600° C. using an indirectly heated calciner, to decompose the ACH and produce a HCl-rich gas that can be recycled to the sparging step. The produced aluminium hydroxide is further sent to a second calcination step operating at higher temperature, over 600° C., preferably between 900 and 1100° C., to convert the hydroxide into the final aluminium oxide ($Al_2O_3$).

After the sparging process, the remaining liquor is a concentrated HCl solution containing the remaining metal chlorides (e.g. Ca2+, Mg2+, Na+). This liquid stream is further processed to recover HCl with $CO_2$ utilization for carbonates production.

However, due to the somewhat heterogeneous nature of the materials, the leachate may have a higher level of $Fe^{2+}/Fe^{3+}$ than can be tolerated in the final carbonate product. If this is the case, iron can be removed by a similar liquid-liquid extraction process to that suggested in NO323417 and U.S. Pat. No. 5,585,080 patents, by using an organic solution, not mixable with water, containing for example, bis (2-ethylhexyl) hydrogen phosphate (Eriksen et al, 2007, Norwegian patent No. 323417) or as in the Anortal-process (U.S. Pat. No. 4,110,399). The use of a diluted organic extractant has been shown to be an efficient media to remove $Fe^{2+}/Fe^{3+}$ from a concentrated HCl solution. When contacted with an iron containing liquor, Tri-butyl phosphate (TBP) diluted in a hydrocarbon solvent selectively extracts $Fe^{3+}$ cation. In the second stage, TBP is regenerated by contacting the loaded solution with acid or water, stripping the metal chlorides from the organic solution before recycling to the extraction stage.

If desirable, HCl can be recovered from the concentrated solution of $FeCl_3/FeCl_2$ by pyrolysis or hydrolytic distillation (as proposed in EP 2 310 323 B1), thus producing $Fe_2O_3$ that can be commercialized depending on the purity.

This solution is sent to a process step where free HCl is recovered by heating the solution above the boiling temperature of HCl/Steam. This process steps benefits from the high chloride salts concentration in the solution, as it acts as "azeotrope breaker" and reduce the energy penalty of the process step. A mixture of HCl/steam is recovered producing a hydrochloric acid solution which can be recirculated in the process. The remaining solution after acid recovery is a concentrated metal-chlorides solution with as low as possible free HCl concentration. Several patents present the possibility of using organic extraction (with different amines) to recover HCl from diluted solutions and the recovery of concentrated HCl by stripping of the amine Contrary to prior art methods (Baniel and Jansen, U.S. patent application No. 2012/0134912 and others) the disclosed process makes use of $CO_2$ in the process of HCl recovery at least partly due to the environmental benefit of $CO_2$ utilization for carbonates production.

The innovative process step disclosed here recovers HCl from a metal chloride rich solution with $CO_2$ immobilization by forming a carbonate. The technology based on amine extraction is applied to the remaining solution after distillation of the free acid. In this step, the solution with metal chlorides is contacted with an organic solution containing at least one amine diluted in a hydrocarbon solution. The mixture of the aqueous and the organic solution is mechanically mixed in a tight reactor which is pressurized with a $CO_2$ containing gas at a pressure of at least 2 bars. Under pressurized conditions the $CO_2$ dissolves in the aqueous phase and reacts with the metal chloride and the amine to produce the corresponding metal carbonate (that precipitates) and an ammonium chloride complex (that remains in the organic phase). As an example, the reaction for 2-valent metallic cations is the following:

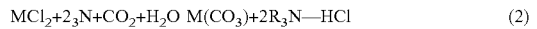

$$MCl_2 + 2_3N + CO_2 + H_2O \rightarrow M(CO_3) + 2R_3N\text{---}HCl \quad (2)$$

Where M represents the metal chloride in solution and 3N a tertiary amine complex where R3 is a carboxylic chain (C6-Cl2).

Tertiary amines with more than 6-carbons are not soluble in water and are therefore preferred. Tertiary amines with less than 6C chains are partially soluble in water whilst their respective ammonium chloride salts are totally water soluble, thus not suitable for the application.

Since the aqueous phase and the organic phase are not miscible, the two phases rapidly separate when the stirring stops. The solid precipitated carbonate remains in the aqueous phase and can easily be separated by filtration, while the amine loaded with HCl can be sent to a stripping step to regenerate the HCl and the amine solution. The solid precipitated carbonate, or metal carbonate is typically one of calcium carbonate, magnesium carbonate, sodium carbonate, sodium bicarbonate Multi-step counter-current configuration can be necessary to reach high recovery efficiencies. In this case, two or more consecutive reactors in counter-current mode might be considered to increase the overall acid recovery as calculated from experimental data shown in Example 3. After extraction, the amine loaded with HCl must be regenerated. A preferred option would be to directly distillate the amine by heating the organic phase at a temperature between 50 and 300° C., most preferred between 50 and 150° C., if necessary with a carrier gas such as steam or inert gas, to produce an HCl-rich gas, as presented in EP2321218 Al and U.S. Pat. No. 4,230,681. Such technology has been previously proposed for regeneration of carboxylic acids in bioreactors for free HCl recovery in diluted acid streams [PCT/IL2009/000392]. The proposed embodiment herein is the first reported process for HCl regeneration from dissolved metallic chlorides solution produced by acid leaching of Al-rich materials.

Direct distillation of the amine to recover HCl gas, pure or mixed with steam or other carrier gas, is the preferred technological path as the produced gas can be readily recirculated to the process or stripped in an absorption column to produce directly concentrated hydrochloric acid. One preferred option for the recovery of HCl is thermal treatment at temperature above 80° C. to produce a HCl containing gas that can be recirculated in the process Another preferred alternative is to contact the HCl-loaded amine with a strong basic solution, like for example NaOH or KOH, to regenerate the amine which can be recirculated to the carbonate precipitation step and producing a concentrated NaCl solution which can fed to chlor-alkali electrolyser to produce concentrated solution of hydrochloric acid and NaOH. After precipitation of the carbonates, the aqueous phase can contain low concentration of other secondary metal chlorides. The aqueous phase can either be further treated to recover HCl from those metal chlorides or considered as waste water and deposited after appropriate treatment to match environment-friendly conditions. Now reverting more in detail to the drawings. FIG. 1 shows a simplified process scheme according to one preferred embodiment.

The process diagram has been simplified, and the different steps with a common purpose have been grouped in blocks:
Step 20 might involve 2 or more consecutive washing and filtering steps with acid and/or water;
the new technology for the sparging (30) has been explained in detail with two preferred embodiments in FIGS. 3b) and 4b), in comparison with previous technology 3a) and 4a) presented by other authors;
the calcination (40) might be carried out in two consecutive ovens at different temperatures for a better total acid recovery:,
the acid recovery (50) might involve an several equipment units (e.g. evaporator and flash unit);
the precipitation might need more than one step, carried out with countercurrent reactors and including phases separation in between reactors, and the amine and acid regeneration can be achieved by different technologies.

FIG. 2. shows a simplified process scheme of the disclosure, where the iron removal step (80) is included to avoid high iron content in the produced PCC.

Such a process comprises various process steps that are explained below in detail with reference to FIG. 1.

In general the process may be seen to comprise at least the following stages.

1) Physical preparation of the Al-rich material.

2) Acid leaching of $Al^{3+}$ and other cations as carbonate promoters from the material,—Liquid and solid recovery.

3) Multi-stage precipitation of $AlCl_3 \cdot 6H_2O$ (ACH) from the aqueous leachate by sparging of dry HCl gas 4) Calcination of ACH for HCl gas regeneration and production of $Al_2O_3$ 5) Iron extraction by liquid/liquid separation method (optional)

6) Acid recovery by evaporation of free HCl from the leachate 7) Precipitation of carbonates from metal-chlorides-rich solution with combined HCl extraction 8) HCl and amine regeneration from the loaded organic solution.

1) Physical Preparation of the Silicate Rock. FIG. 1—Step 00

The Al rich source material, for example anorthosite, can be selectively mined. Contaminating side fractions or layers/bands can be optically sorted. The physical preparation of the material includes;

a) Crushing and milling to less than 0.5 mm diameter size fraction.

b) If necessary, iron and magnesium containing fractions are removed by optical sorting, magnetic separation or other suitable method known in the art.

2) Acid Leaching of $Al^+$ and Other Metallic Ions from the Material, —Leachate and SiO2 Recovery. FIG. 1—Step 10 and 20

The crushed and pretreated material is dissolved in HCl acidic solution (1 to 13 M) in a dissolution reactor at 80° C. and 160° C. at atmospheric pressure or pressurized conditions up to 10 bars.

After dissolution in the leaching step, solid residues (unreacted fractions and $SiO_2$) are separated from the leachate by centrifugation and/or filtration. In the process scheme, unreacted fractions may be separated from the amorphous $SiO_2$ product, e.g. by density/ grain separation techniques using hydro-cyclones in series or parallel or any other suitable separation technique known in the art. After separation, unreacted fractions may be reintroduced to the acid leaching step. Also unreacted acid leaving the leaching reactor may be at least partially recovered by flash evaporation and recycled to the leaching step.

$SiO_2$ product may be washed, in one or several repetitions, by use of diluted acid and water washing steps organized in a counter current manner to remove traces of dissolved cations and HCl and produce a commercial product. Optionally, further chemical treatment of $SiO_2$ can be performed to reach higher purity in the product.

In practice the leaching step may be arranged in a number of different ways, ranging from single batch process—one or several leaching reactors operating in parallel, depending on the production rate necessities—to a multiple batch configuration using leaching reactors interconnected in series—depending on the material dissolution kinetics. For high-reactivity ores where the leaching time is realistic for industrial scale, the preferred configuration is the single batch process, that can be performed in parallel reactors if high volumes are processed. As described in Example 1, the one-batch configuration has been successfully proved at pilot scale using anorthosite. Laboratory tests have also shown that consecutive batches and for semi-continuous leaching (by partially substituting the leachates for fresh acid during the process) can be beneficial for increasing the dissolution kinetics and reduce the overall leaching time, which can be beneficial for low reactivity ores or diluted acid concentrations.

3) Precipitation of ACH from the Leachate by Sparging of Dry HCl Gas. FIGS. 1 and 2—Step 30

Leachate containing solubilized chloride metals is sparged with a dry gas containing HCl in a crystalizing reactor maintained at temperature between 50° C. and 90° C. until the concentration of HCl in the solution reaches 30 wt %. At this concentration, the maximum solubility of $Al^{3+}$ is 3 g/L, thus excess $Al^{3+}$ present in the starting leachate precipitates as $AlCl_3 \cdot 6H_2O$, an hydrated salt that can be separated from the acid solution containing dissolved $Ca^{2+}$, $Mg^{2+}$ and $Fe^{2\ 3+}$ among others.

4) Calcination of ACH for HCl Gas Recovery and Production of $Al_2O_3$. FIGS. 1 and 2—Step 40

To recover HCl gas and produce $Al_2O_3$, ACH solid is heated in a two steps calcination process. In the first calciner, ACH is decomposed at temperature between 400 and 550° C. to produce HCl gas using indirect heating to avoid contamination of the HCl gas. In the second step, the aluminium hydroxide is heated at temperature above 1000° C. in a circulating fluidized bed system or in a rotating kiln in order to produce $Al_2O_3$ with a low LOI and low alpha form.

5) Iron Extraction by Liquid/Liquid Separation Method (Optional). FIG. 2—Step 80

It is an optional step to separate the iron ions from the aqueous solution with a liquid/liquid extraction method with the process configuration according to claim 10 and shown in FIG. 2.

6) Acid Recovery by Evaporation. FIGS. 1 and 2—Step 80

After sparging and separation of the precipitated ACH, the aqueous solution contains at least 20 wt % HCl, together with the remaining metal chlorides in solution. HCl is recovered from the leachate solution by evaporation or distillation. The process strongly benefit from the high chlorides metal concentrations in the feed stream as chlorides act as «azeotrop breaker» and allows for a recovery of concentrated HCl with less energy, The distillation is pursued until all the HCl are recovered. If necessary, precipitated solids during pH increase such as $Al(OH)_3$ are filtrated from the aqueous phase and dissolved in the leaching reactor.

7) Precipitation of Carbonate from the Metal-Chloride-Rich Solution with Combined HCl Extraction. FIGS. 1 and 2—Steps 60

The metal-chloride-rich aqueous solution is contacted with an organic solution containing a tertiary or a quaternary amine dissolved in at least one organic solvent, such as one or a mixture of hydrocarbon diluent. While mixing the organic and the aqueous phase, the reactor is pressurized with a $CO_2$ containing gas at a pressure of at least 10 bars and at ambient temperature. After a reaction time between 3 and 20 minutes, the reactor vessels is depressurized and the aqueous phase containing solid metal carbonate separates from the organic phase containing the HCl loaded amine. After separation of the two liquid phases, the carbonate-rich solution is pumped to the deposition site or filtered to recover the solid carbonate.

8) HCl and Amine Regeneration from the Loaded Amine. FIGS. 1 and 2—Step 70

The organic solution loaded with HCl (ammonium chloride salt/amine hydrochloride salt) is heated at temperature above 150° C., to decompose the amine-HCl complex and generate a HCl-containing gas that can be recirculated to the process.

The distillation can be carried out using $N_2$ or any other inert carrying gas. After distillation, the regenerated amine is recirculated to the carbonate precipitation stage.

Alternatively, the HCl-loaded amine can be regenerated by contacting the organic phase with a concentrated aqueous basic solution and recirculated to the PCC production step. The produced NaCl can be used as feed solution for in a chloro-alkali ectrolyser to produce HCl and NaOH.

EXAMPLES

All the process steps have been tested at laboratory scale, and the first core step at pilot scale (leaching of Al-rich mineral) showing the technical feasibility. The following examples will serve only to illustrate the practice the process and provide a useful description of the principles and conceptual aspects thereof, not limiting the invention to these particular embodiments.

Example 1

Leaching

In a reactor of 100 liters design capacity, 15 kg of anorthosite slurry in water (33 wt % water) is mixed with 38 l of a preheated HCl solution (22 wt % HCl) at 70° C. The anorthosite particle size is 300 micron. The mixture is further heated up to 140° C. (with steam flowing through the reactor steam-jacket), building a pressure of 2.5 bar, under vigorous mechanical stirring. The total reaction time from the mixing point is 5 hours. Samples of the mixture are taken at 2.5 and 5 hours, filtered and analysed by ICP-MS (Ion Coupled Plasma with Mass Spectrometer). The measured aluminium recovered from the anorthosite to the liquid fraction is 88 wt % at 2.5 h and 95 wt % at 5 hours.

Example 2

HCl Extraction and Metal Carbonate Precipitation with Different Amines

Several types of amine solutions were tested to evaluate the influence of the chemical nature of the active organic phase on the PCC technology. The chemical properties of the amine function are related to the capacity of the free electron pair of the N atom to form hydrogen bonds. In case of an acid extraction process, the strength of the amine (extraction capacity) is also determined by the availability of its unshared electron-pair to an electrophilic proton of the acid to extract. This availability is determined by the inductive effect of the atoms and chains bonded to the N atom (Eyal et al. (1991)). Due to the inductive effect of substituting H by an aliphatic chain, tertiary amines are expected to have a higher basic strength than primary and secondary amines. In addition, basicity is expected to increase with the length of the aliphatic chain.

In this technology, the basic strength of the amine is also expected to play an important role in its ability to react with $CaCl_2$ and $HCO_3^{2-}$ to produce the ammonium hydrochloride salt and $CaCO_3$. The basic strength of the amine function has to be sufficiently high to balance the acidification of the aqueous solution due to the dissolution of $CO_2$ and formation of carbonic acid and allow the formation of $CaCO_3$. However, amine with an higher basic strength will form more stable amine hydrochloride complex that will require more energy to decompose or thermolyse in the regeneration step.

Tertiary amines (3N) with various carbon chain length, R from 4 to 12 carbons were here tested for the precipitation of $CaCO_3$ from a $CaCl_2$ solution. The following amines with straight carbon chains were assessed:

C4: Tri-butyalmine (TBA); C6: Tri-hexylamine (THA); C8: Trioctylamine (TnOA), Tri-iso-octylamine (TiOA) and C12: Tri-docdecylamine (TDA). In addition a branched tertiary amine solution with 8C chains was tested for the PCC reaction: Tri-2etyl-hexylamine (TEHA).

Tests with TBA showed a close to 100% conversion of the amine into ammonium hydrochloride salt thanks to its low viscosity and very efficient PCC formation. However, in its salt form, the amine is soluble in water, rendering challenging the regeneration of the HCl and the TBA without evaporation or post-processing of a large quantity of water.

THA and TOA in identical experimental conditions (50% amine in 1/3 decanol-2/3 Asol diluent, Ca- to-amine ratio=2, time, $pCO_2$), presented close to identical high efficiency yields. Despite its stronger basicity and higher thermal stability, TDA (12 C) is a more challenging organic amine to use in this process due to its higher viscosity. In the same dilution conditions as the other amines, a lower PCC yield of 13% was obtained, due to the difficulty to properly contact the aqueous and organic phases in the laboratory vessels. In a future work, additional tests in more diluted conditions (<50% amine in solvent) should be evaluated.

Finally the 8C branched amine, TEHA, did not show any precipitation of $CaCO_3$ or HCl during testing despite its expected stronger basicity and low viscosity. A possible explanation for this behavior might be a steric hindrance of the amine function by the branched aliphatic groups, reducing the accessibility of the electron pair for co-precipitation of CaCO3 and HCl extraction.

A particular example of potential modifier is the use of an organic acid in addition of the amine and the dilutent. When added to the extractant, those compounds were proved to increase the selectivity and reversibility of the amine (Eyal et al. (1982)). Other acid extractants such as quaternary amines (Aliquat) or phosphine-based acid extractant such as TBP might also be interesting candidates for the liquid extraction process with $CaCO_3$ precipitation that need further experimental work. A more thorough investigation on the effect of these amines on the technology can be performed to identify the critical parameters and the optimal conditions for this new $CO_2$-storage technology. From the tested amines, efficiencies over 80 wt % of $CaCO_3$ precipitation were achieved in only one step with TiOA diluted in Decanol/Asol, and with THA diluted in Decanol/Asol and in Dodecane. An efficiency of 76 wt % was achieved with TOA in Decanol/Asol, which could be enough when applying several steps, if the regeneration of the amine results energetically advantageous.

Example 3

Calculation of the Necessary Stages for HCl Extraction

From the different experimental tests, one representative case was selected to determine the required countercurrent stages by applying an adapted McCabe Thiele diagram method. In this case, the organic phase was the Tri-iso-octylamine (TiOA) with an amine to organic dilutants ratio of 1:1 (vol) and decanol and asol as dilutants in a proportion of 2:1 vol. The McCabe-Thiele method is widely used in metallurgy for pre-engineering and pilot design since it gives a good approximation of the volumes, stages, concentrations, etc. with relatively low complexity. The distribution curves or equilibrium isotherms are experimentally obtained under the process conditions, and represent the final concentration of a dissolved component in the two phases (aqueous and organic) when the mixture reaches the equilibrium. The proof-of-concept based on process solutions and the generation of accurate engineering data can only be done in a pilot plant, though its efficiency is calculated by comparison with laboratory curves and data.

In this process, the method had to be adapted to the unique nature of the reaction, which is not a conventional liquid/liquid organic extraction, but a 4-phase extractive/chemical reaction. Thus, the calcium does not remain "dissolved" in the organic phase, but precipitates back to the aqueous phase as calcium carbonate, so the corresponding theoretical HCl in the aqueous solution has to be calculated from the chemical equation.

Therefore, a set of experiments with fixed $CaCl_2$ concentration (0.875 Molar), varying the organic to aqueous phase (O/A from 2.45 to 5.25) and bubbling $CO_2$ at 50 bar during 20 minutes to reach equilibrium were performed to determine the precipitated calcium carbonate.

The expected $CaCl_2$ concentration of the feed stream in the global process (coming from the sparging and evaporation step) was determined, corresponding to 0.09 kg (HCl)/kg (water).

Considering an efficiency of 90% acid extraction, the number of counter current steps were estimated.

From these results, two counter-current extraction steps were calculated for those conditions, and their specific stream compositions were obtained and considered for mass and energy balances, for the list of equipment implementation and cost estimation of the process. It is important to highlight that these results are specific for this extraction conditions and amine type, though they prove the realistic number of steps needed for the acid extraction.

The invention claimed is:

1. A process for producing alumina and carbonate from aluminium-rich materials with integrated $CO_2$ utilization, comprising the steps of:
   a. crushing and milling the aluminium-rich materials;
   b. leaching the crushed materials with a concentrated mineral acid comprising HCl to produce a metal chloride solution and unreacted solid materials;
   c. separating unreacted solid materials from the metal chloride solution;
   d. separating $Al^{3+}$ from the metal chloride solution by crystallization of $AlCl_3\text{-}6H_2O$ by increasing the amount of HCl in the metal chloride solution;
   e. calcining $AlCl_3\text{-}6H_2O$ and separating HCl byproduct to produce $Al_2O_3$ by first indirectly heating at a temperature between 400° C. and 600° C. to produce an HCl-rich gas, and then heating at a temperature above 600° C. to produce $Al_2O_3$;
   f. precipitating metal carbonates from the metal chloride aqueous solution coming from step (e) by mixing the metal chloride solution with an organic solution containing an amine to yield a mixture, and then contacting the mixture with $CO_2$ gas to form ammonium chloride salt complex and precipitate and separate a metal carbonate;
   g. regenerating HCl and the amine by processing the organic solution thermally or chemically.

2. The process according to claim 1, wherein the leaching is performed at a temperature within the range of 80-180° C. with HCl concentration under 13M and at a pressure below 10 bars.

3. Process according to claim 1, wherein the step of leaching is performed for a time within the range of 0.5 to 24 hours.

4. Process according to claim 1, comprising crushing and milling the aluminum-rich materials to a particle size smaller than 20 mm.

5. Process according to claim 1, comprising the step of removing iron-rich materials by magnetic separation or optical sorting prior to step (b).

6. Process according to claim 1, wherein step (c) is performed by filtration and washing with a solution selected from the group consisting of an acidic solution and water to recover metal chlorides and unreacted acid.

7. Process according to claim 1, wherein the step of precipitating is performed by bubbling a HCl-containing gas, followed by filtering and washing with a solution selected from the group consisting of an acidic solution and water.

8. Process according to claim 1, wherein $AlCl_3\text{-}6H_2O$ is crystallized from the metal chloride solution by mixing with a concentrated HCl solution, filtering and washing with a solution selected from the group consisting of an acidic solution and water.

9. Process according to claim 1, comprising the step of redissolving precipitated $AlCl_3\text{-}6H_2O$ with impurities into a solution selected from the group consisting of hydrochloric aqueous solution and water, followed by filtering and then repeating step (d).

10. Process according to claim 1, comprising treating the metal chloride solution by liquid/liquid organic extraction after step (d) to reduce the iron content of the metal chloride solution.

11. Process according to claim 1, wherein the crystallization step yields an Al-lean metal chloride solution, comprising treating the Al-lean metal chloride solution by distillation or other concentrating process to recover free acid and increase the concentration of metal chloride in the solution.

12. Process according to claim 1, wherein the crystallization step yields an Al-lean metal chloride solution, comprising precipitating metal carbonate by contacting the Al-lean metal chloride solution with a pressurized $CO_2$ containing gas and an organic solution containing a tertiary or a quaternary amine diluted in at least one organic solvent.

13. Process according to claim 12, comprising regenerating HCl from the organic solution by thermal treatment at a temperature above 80° C. to produce an HCl-containing gas.

14. The process of claim 13, comprising the step of recirculating the HCl-containing gas to an earlier step within the process.

15. Process according to claim 12, comprising regenerating amine by contacting the organic solution with a concentrated basic solution.

16. The process of claim 15, comprising recirculating the amine to the precipitation step (f).

17. The process according to claim 12, wherein the precipitated metal carbonate is selected from the group consisting of calcium carbonate, magnesium carbonate, sodium carbonate and sodium bicarbonate.

* * * * *

UNITED STATES PATENT AND TRADEMARK OFFICE
CERTIFICATE OF CORRECTION

PATENT NO. : 9,963,352 B2
APPLICATION NO. : 15/124487
DATED : May 8, 2018
INVENTOR(S) : Asunción Aranda and Johann Mastin Page 1 of 1

It is certified that error appears in the above-identified patent and that said Letters Patent is hereby corrected as shown below:

On the Title Page

(73) Assignee:
Insert --INSTITUTT FOR ENERGITEKNIKK, Kjeller (NO)--

Signed and Sealed this
Fifteenth Day of January, 2019

Andrei Iancu
*Director of the United States Patent and Trademark Office*